(12) United States Patent
Cheng et al.

(10) Patent No.: US 9,876,767 B2
(45) Date of Patent: Jan. 23, 2018

(54) SECURE DEVICE-TO-DEVICE (D2D) COMMUNICATION

(71) Applicant: Alcatel Lucent, Paris (FR)

(72) Inventors: Fang-Chen Cheng, Murray Hill, NJ (US); Said Tatesh, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 188 days.

(21) Appl. No.: 14/274,012

(22) Filed: May 9, 2014

(65) Prior Publication Data

US 2015/0326537 A1   Nov. 12, 2015

(51) Int. Cl.
| | |
|---|---|
| *H04L 29/06* | (2006.01) |
| *H04W 12/04* | (2009.01) |
| *H04W 12/02* | (2009.01) |
| *H04W 12/10* | (2009.01) |
| *H04W 4/00* | (2009.01) |
| *H04W 4/08* | (2009.01) |
| *H04W 76/02* | (2009.01) |

(52) U.S. Cl.
CPC ......... *H04L 63/0428* (2013.01); *H04W 4/008* (2013.01); *H04W 4/08* (2013.01); *H04W 12/02* (2013.01); *H04W 12/04* (2013.01); *H04W 12/10* (2013.01); *H04W 76/023* (2013.01)

(58) Field of Classification Search
None
See application file for complete search history.

(56) References Cited

U.S. PATENT DOCUMENTS

| | | | | |
|---|---|---|---|---|
| 2009/0245516 A1* | 10/2009 | Ravikiran | ............. | H04L 9/0869 380/268 |
| 2009/0276803 A1* | 11/2009 | Weaver | ............. | H04N 7/17318 725/32 |
| 2010/0125915 A1* | 5/2010 | Hall | ........................ | G06F 21/85 726/26 |
| 2013/0013926 A1* | 1/2013 | Hakola | ................. | H04W 12/04 713/171 |
| 2013/0315393 A1* | 11/2013 | Wang | .................... | H04W 12/04 380/270 |
| 2014/0068023 A1* | 3/2014 | Arickan | ............. | H04L 61/2015 709/220 |
| 2014/0094119 A1* | 4/2014 | Stojanovski | ...... | H04W 52/0212 455/41.1 |
| 2014/0301552 A1* | 10/2014 | Yi | ............................ | H04L 9/30 380/270 |
| 2015/0264052 A1* | 9/2015 | Cho | ....................... | H04W 4/008 713/176 |

OTHER PUBLICATIONS

Liu et al, "Secure D2D Communication in Large-Scale Cognitive Cellular Networks with Wireless Power Transfer", 2015, IEEE ICC 2015—Communication Theory Symposium, p. 4309-4314.*

(Continued)

*Primary Examiner* — Christopher Revak
(74) *Attorney, Agent, or Firm* — Davidson Sheehan LLP

(57) ABSTRACT

User equipment decrypt information received in a first frame over an air interface during device-to-device (D2D) communication with another user equipment. The information is decrypted using a cryptographic function that is applied to a security key and a first frame number of the first frame.

22 Claims, 6 Drawing Sheets

(56) References Cited

OTHER PUBLICATIONS

Ghanem et al, "Secure Communication with D2D Cooperation", 2015, IEEE, p. 1-6.*
Shen et al, "Secure Key Establishment for Device-to-Device Communications", Oct. 9, 2014, p. 1-5.*
Alam et al, "Secure Device-to-Device Communication in LTE-A", Apr. 2014, IEEE Communications Magazine, p. 66-73.*
"RAN1 Chairman's Notes", 3GPP TSG RAN WG1 Meeting 376bis, Section 7.2.7 (LTE Device to Device Proximity Services), Mar. 31-Apr. 4, 2014, pp. 34-47.
"Report of 3GPP TSG RAN WG2 Meeting #85bis", 3GPP, Section 7.4.2 (D2D Communication), Mar. 31-Apr. 4, 2014, pp. 57-60.

* cited by examiner

SECURE DEVICE-TO-DEVICE (D2D) COMMUNICATION

BACKGROUND

Field of the Disclosure

The present disclosure relates generally to wireless communication and, more particularly, to wireless device-to-device (D2D) communication.

Description of the Related Art

Wireless communication systems provide wireless connectivity to user equipment using a network of interconnected access nodes or base stations. Communication over the air interface between the user equipment and the base stations takes place according to various agreed-upon standards. For example, the Third Generation Partnership Project (3GPP, 3GPP2) has specified a set of standards for a packet-switched wireless communication system referred to as Long Term Evolution (LTE). The LTE standards support access schemes including single-carrier frequency division multiple access (SC-FDMA). Multiple users can concurrently access the SC-FDMA network using different sets of non-overlapping Fourier-coefficients or sub-carriers. One distinguishing feature of SC-FDMA is that it leads to a single-component carrier transmit signal. The LTE standards also support multiple-input/multiple-output (MIMO) communication over the air interface using multiple antennas deployed at transmitters or receivers. The carrier bandwidth supported by LTE is approximately 20 MHz, which can support a downlink peak data rate of approximately 100 Mbps and a peak data rate of the uplink of approximately 50 Mbps.

User equipment may implement transceivers that include a transmitter for transmitting uplink signals towards the network and a receiver for receiving downlink signals transmitted by the network. Transceivers implemented in user equipment may communicate according to the SC-FDMA standards using different sets of non-overlapping Fourier-coefficients or sub-carriers. User equipment conventionally communicate with each other by transmitting signals over a communication path that originates at the transmitter of the first user equipment, travels over an uplink (or reverse link) to a receiver in a network base station, proceeds to a transmitter in the receiving base station or another base station, and is then transmitted over a downlink (or forward link) to a receiver in the second user equipment. Consequently, a conventional network communication path between the two user equipment includes network elements such as base stations, switches, and routers.

Future generations of wireless communication protocols are likely to support device-to-device (D2D) communication that does not necessarily include the network in the communication path between two wireless communication devices. For example, D2D communication allows two user equipment to communicate directly with each other over an air interface between the two user equipment and no network elements are included in the D2D communication path. The D2D communication protocols can be used to support voice or data transmission on a one-to-one basis (unicast), on a one-to-many basis (groupcast) for applications such as push-to-talk (PTT), or on a one-to-all basis (broadcast). The absence of network support should not interfere with D2D communication and user equipment can perform D2D communication in either an in-coverage scenario (when user equipment are able to communicate with the network) or an out-of-coverage scenario (when user equipment are not in communication with the network).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
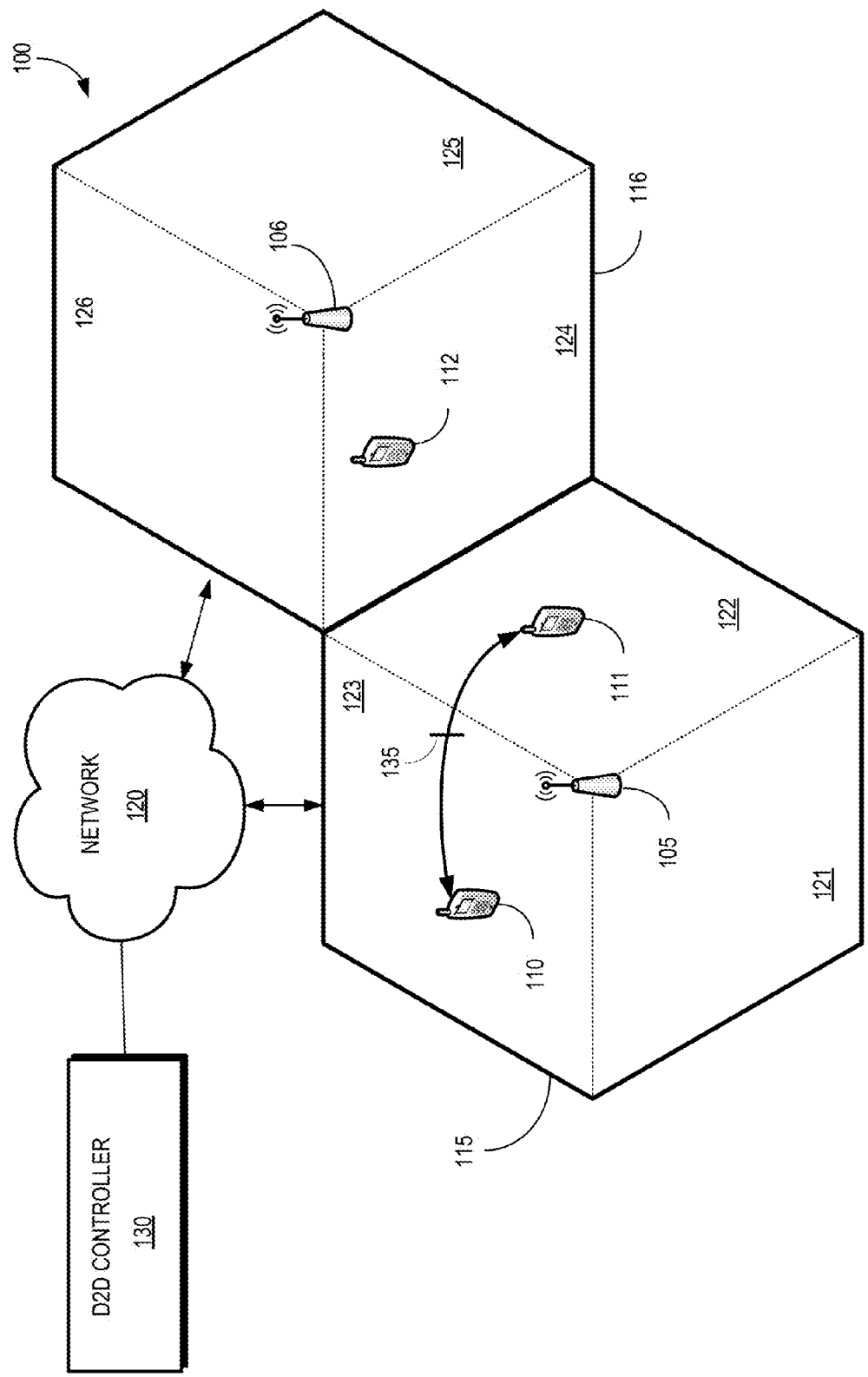
FIG. 1 is a block diagram of a wireless communication system according to some embodiments.

Providing secure D2D communication is difficult, particularly in out-of-coverage scenarios because the network is not available to negotiate or establish secure communication links over the air interface, e.g. according to Authentication and Key Agreement (AKA) protocols. Furthermore, user equipment may unpredictably or unexpectedly join or leave a particular D2D groupcast or broadcast, e.g., because of changes in the channel conditions or relative distances between user equipment. Conventional security protocols require renegotiating the security agreements whenever the membership of a group changes. However, interrupting a D2D groupcast or broadcast to renegotiate security agreements in response to changes in group membership would increase the overhead of D2D communication and decrease the user's quality of experience.

Secure D2D communication among dynamically varying sets of user equipment can be supported by user equipment that are able to encrypt or decrypt frames for secure D2D communication using a cryptographic function that is applied to a pre-provisioned security key and a frame number of the frame. As used herein, the term "pre-provisioned" is understood to mean that the security key has been provided to the user equipment by the network prior to the network becoming unavailable to supply security keys to the user equipment and prior to the user equipment using the security key to establish secure D2D communication with one or more other user equipment. Thus, the pre-provisioned security key can be used to establish secure D2D communications in an out-of-network scenario.

Some embodiments of the user equipment may determine the frame number of the frame based on a reference frame number and a corresponding reference time. For example, user equipment may store values of a reference frame number and a reference time. The user equipment can then determine a current time based on a global timing reference such as a Global Positioning System (GPS) timing reference or a Long Term Evolution (LTE) timing reference. The user equipment can compare the reference time to the current time to determine how much time has elapsed since the reference time and, consequently, the user equipment can determine how many frames have elapsed since the reference frame number. User equipment may therefore determine the security parameters needed for encryption or decryption of each frame of the secure D2D communication based on information available at the user equipment when network is not present. Network assistance and control are considered as distributed to each user equipment to support secure D2D communication. Moreover, user equipment can begin decrypting secure D2D communications at any frame without additional control information from the network or other user equipment.

Some embodiments of user equipment include a data structure to map the physical layer identifiers for each authorized type of secure D2D communication to a corresponding security key. For example, if the user equipment is authorized for unicast D2D communication with one other user equipment, groupcast D2D communication with a group of user equipment, and broadcast D2D communication, the data structure may map a unicast identifier to a unicast security key shared with the other user equipment, a groupcast identifier to a groupcast security key shared with the group of user equipment, and a broadcast identifier to a public key.

FIG. 1 is a block diagram of a wireless communication system 100 according to some embodiments. The wireless communication system 100 includes base stations 105, 106 that are configured to provide wireless connectivity to user equipment 110, 111, 112 (collectively referred to herein as "user equipment 110-112") in corresponding cells 115, 116. Some embodiments of the wireless communication system 100 also include a network 120 for facilitating communication between network elements such as the base stations 105, 106 and other elements within the system 100 or elements that are external to the system 100. Communication between the base stations 105, 106 and user equipment 110-112 may be performed according to the LTE standards for packet-switched wireless communication systems. However, some embodiments may use other standards or protocols for supporting communication within the wireless communication system 100.

The cells 115, 116 are subdivided into sectors 121, 122, 123, 124, 125, 126 (collectively referred to as "the sectors 121-126") that may be served independently. For example, the base stations 105, 106 may implement or deploy antenna configurations and hardware, firmware, or software that allows the user equipment 110-112 in the different sectors 121-126 to be served independently. User equipment 110-112 may hand off when they transition between different sectors 121-126. Although the cells 115, 116 are depicted in FIG. 1 as perfect hexagons and the sectors 121-126 are depicted as identical parallelograms that perfectly subdivide the cells 115, 116, actual cells 115, 116 or sectors 121-126 may have irregular shapes that may vary in time due to geography, topography, environmental conditions, configuration of the base stations 105, 106, changing antenna configurations, or other factors.

The wireless communication system 100 includes one or more D2D controllers 130 that may be used to configure or control D2D communication within the wireless communication system 100. As used herein, the term "D2D communication" refers to communication between at least two user equipment 110-112 that does not include network elements such as base stations 105, 106 in the communication path between the user equipment 110-112 that are participating in the D2D communication session. Thus, D2D communication occurs over an air interface established between the different user equipment 110-112 involved in the D2D communication session. For example, the user equipment 110 and the user equipment 111 may communicate using one or more D2D communication channels established over the air interface 135. The D2D communication can occur over an air interface established between two user equipment or over an air interface shared by more than two user equipment, e.g., for groupcast or broadcast D2D communication. Transmissions over the air interface 135 may be divided into frames or subframes to facilitate synchronization of communication between the base stations 105, 106 and user equipment 110-112.

Although network elements such as the base stations 105, 106 are not in the communication path during D2D communication, the network may still control and monitor the communication. For example, the network may provide a network timing (such as an LTE reference time) that can be used by the user equipment 110-112 as the reference time for deriving the timing of other user equipment during the D2D communication. The network may allocate radio resource dynamically for the D2D communication. User equipment 110-112 may also use timing provided by a Global Positioning System (GPS) timing reference. Furthermore, entities in the network 120 or the D2D controller 130 may monitor D2D communication between two or more user equipment, e.g., so that the network can manage the radio resource and control the users for "leasing" air interface resources for the D2D communication.

The D2D controller 130 is depicted in FIG. 1 as a stand-alone entity that can communicate with the base stations 105, 106 via the network 120. However, some embodiments of the D2D controller 130 may be deployed in different locations or in a distributed fashion at multiple locations in the wireless communication system 100. For example, the D2D controller 130 may be implemented in the base stations 105, 106 or at other locations within the wireless communication system 100.

Some embodiments of the D2D controller 130 can authenticate user equipment 110-112 for D2D communication in two different modes: the network-assist mode (also referred to as in-network mode) and the network-absent mode (also referred to as out-of-network mode). In the network-assist mode, network side elements such as the base stations 105, 106 or the D2D controller 130 are available and can communicate with user equipment 110-112. The user equipment 110-112 may therefore use a network timing reference for communication with the network as well as D2D communication. The network may also provide D2D authentication, authorization, communication parameters, and the like concurrently with user equipment 110-112 initiating D2D communication in the network-assist mode. In the network-absent mode, the network is not available to provide a network timing reference or other information, such as signaling control and system information, to the user equipment. Thus, user equipment 110-112 that participate in network-absent D2D communication may have been pre-configured or pre-authorized to perform D2D communication with provisioned network control at the time of the D2D communication session.

In one embodiment that implements the network-assist mode, the wireless communication system 100 may authorize user equipment 110-112 for D2D communication in response to a request from the user equipment 110-112 and before the user equipment 110-112 performs device discovery to detect other user equipment 110-112. The process of authorizing and configuring user equipment 110-112 for D2D communication of a new user equipment before the start of any communication with LTE network or D2D communication may also be referred to as "activation" of the user equipment 110-112. As discussed herein, security keys, D2D communication identifiers, reference frame numbers, and corresponding reference times may be provided to the user equipment 110-112 during activation. The requesting user equipment 110-112 may have acquired LTE system information and locked to the downlink timing of its serving cell 115 before the user equipment 110-112 is authorized to perform the D2D device discovery or communication when user equipment is in LTE network coverage. The requesting user equipment 110-112 may discover other user equipment 110-112 by detecting D2D synchronization signals or preamble and so the user equipment 110-112 may be configured to transmit synchronization signals with a configurable time interval that may be known by other devices in the wireless communication system 100.

In one embodiment that implements the network-absent mode, the wireless communication system 100 may authorize user equipment 110-112 for D2D communication during an activation process prior to user equipment 110-112 initiating D2D communication so that the user equipment 110-112 is pre-authorized or pre-configured for D2D communication in the event that the network becomes unavailable or absent. The network-absent mode may be particularly useful to support D2D communication in emergency situations, during natural disasters, and other situations where public safety is at risk. Prior to operating in the network-absent mode, user equipment 110-112 may be pre-authorized by the D2D controller 130 for subsequent D2D communication when the network is not available to assist device discovery and communication. User equipment 110-112 may establish the network-absent mode of D2D communication in response to determining that the network is not available or present.

User equipment 110-112 that have been activated and are authorized to participate in D2D communication may store information provided by the D2D controller 130 to support secure D2D communication. Some embodiments of user equipment 110-112 may be provided with one or more D2D identifiers to identify each D2D relationship that has been authorized for secure D2D communication by the D2D controller 130. For example, user equipment 110-112 may store D2D identifiers for one or more unicast D2D communication sessions, one or more groupcast D2D communication sessions, and one or more broadcast D2D communication sessions. The D2D controller 130 also provides security keys to the user equipment 110-112 that can be used to encrypt or decrypt information communicated during D2D communication. For example, the secure D2D communications may be encrypted or decrypted based on a cryptography function that uses the security keys and a crypto-sync such as a frame number of an encrypted frame of the D2D communication. Some embodiments of the user equipment 110-112 may be able to derive the frame number from the current time based on a reference frame number and a reference time stored by the user equipment 110-112, as discussed herein.

Figure 2:
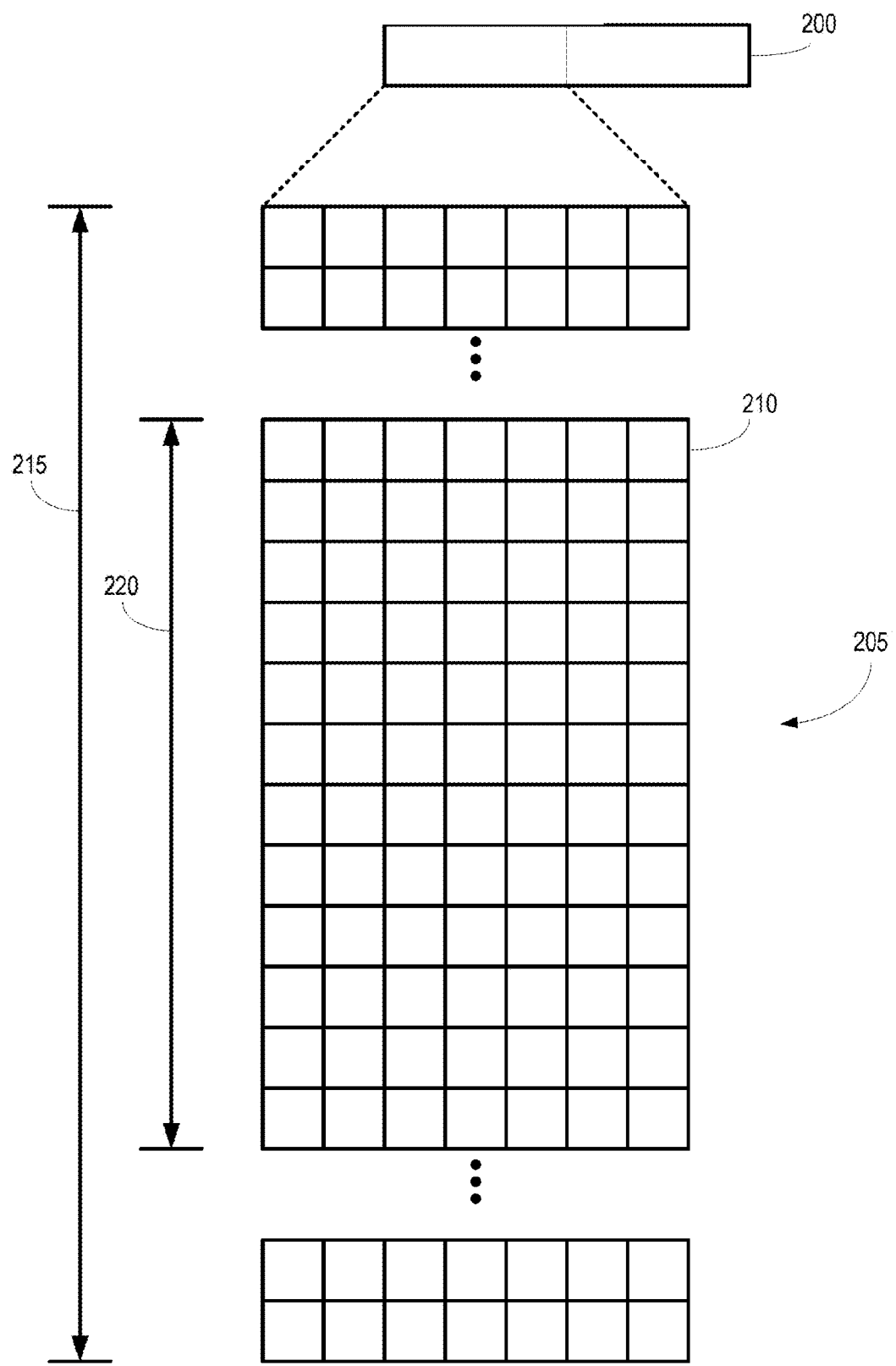
FIG. 2 is a block diagram of a resource grid for a timeslot of a frame that may be used for D2D communication according to some embodiments.

FIG. 2 is a block diagram of a resource grid for a timeslot 205 in a frame 200 that may be used for D2D communication according to some embodiments. The frame 200 may be used for D2D communication over an air interface such as the air interface 135 shown in FIG. 1 may include one or more timeslots such as the timeslot 205 shown in FIG. 2. The timeslot 205 is divided into a plurality of resource elements or physical resource blocks 210 (only one indicated by a reference numeral in the interest of clarity) that are defined by a time interval and a frequency band or subcarrier frequency. For example, the timeslot 205 may have a total duration of 0.5 ms and may be divided into seven (7) time intervals that are distributed along the horizontal direction in FIG. 2. The timeslot 205 may also include a predetermined number 215 of frequency bands or subcarrier frequencies that are distributed along the vertical direction in FIG. 2. The number 215 may depend upon the transmission bandwidth of the air interface. The predetermined number 215 may also be divided into one or more subsets 220 of physical resource blocks.

Figure 3:
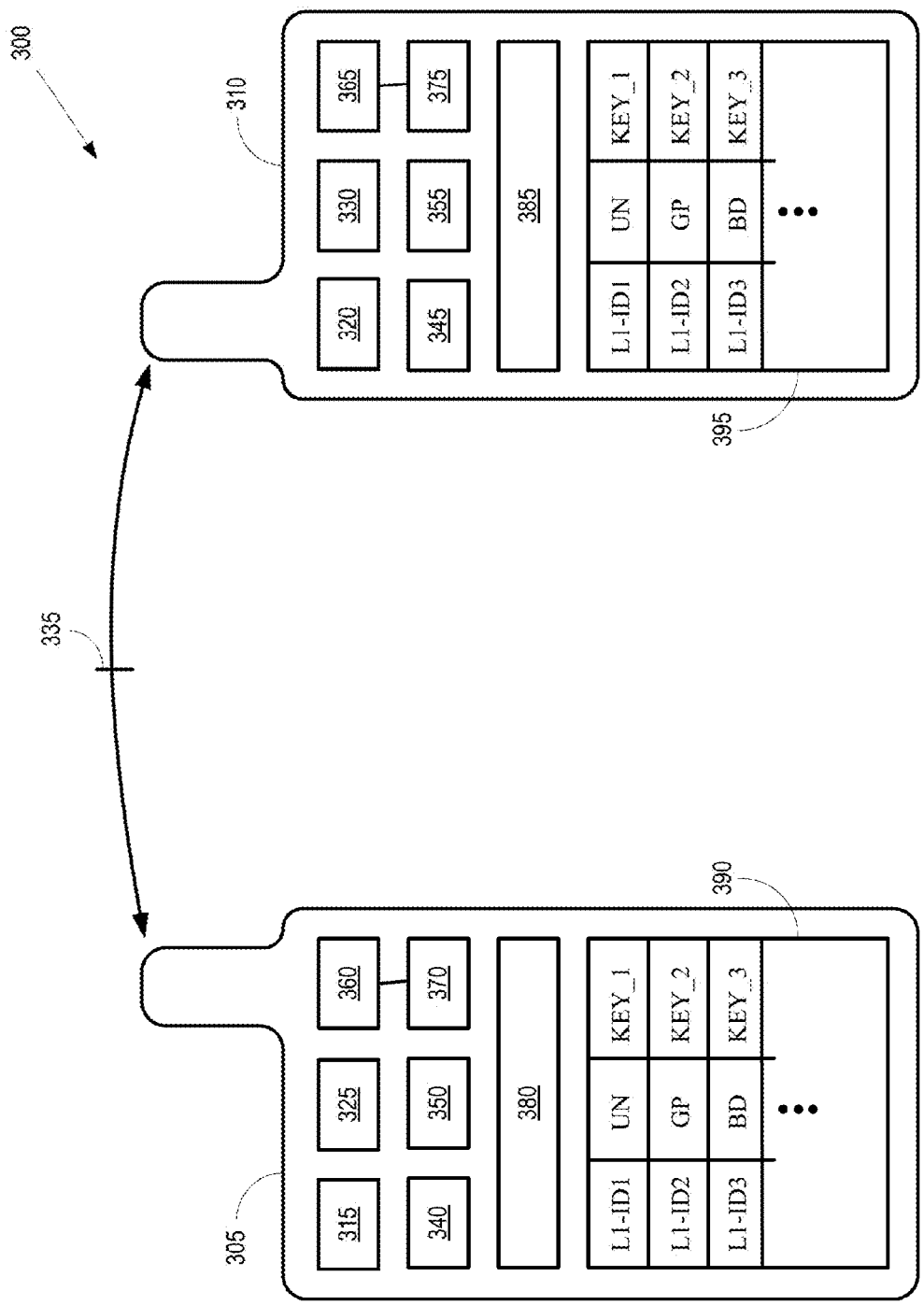
FIG. 3 is a block diagram of a wireless communication system that supports D2D communication according to some embodiments.

FIG. 3 is a block diagram of a wireless communication system 300 that supports D2D communication according to some embodiments. The wireless communication system 300 includes user equipment 305, 310, which may correspond to some embodiments of the user equipment 110-112 shown in FIG. 1. The user equipment 305, 310 include a transmitter 315, 320 and a receiver 325, 330. Although the transmitters 315, 320 and the receivers 325, 330 are depicted as separate structures in FIG. 3, some embodiments of the user equipment 305, 310 may implement both the transmitter 315, 320 and the receiver 325, 330 into a single transceiver structure. The transmitter 315, 320 and the receiver 325, 330 can be used to transmit and receive signals over D2D communication channels of an air interface 335 that is formed directly between the user equipment 305, 310. No network elements are present in the communication path between the user equipment 305, 310 during D2D communication.

The user equipment 305, 310 include memory elements 340, 345 to store information that represents or indicates a reference frame number for D2D communication. The user equipment 305, 310 also include memory elements 350, 355 that are used to store information that represents or indicates a reference time that corresponds to the reference frame number. The reference frame number and the reference time are the same for all user equipment 305, 310 that are authorized for D2D communication within the wireless communication system 300. Thus, the reference frame number and the reference time can be used as the default frame counter mechanism during D2D communication during network-assisted mode or network-absent mode. The reference frame number and the reference time may be provided during activation of the user equipment 305, 310, e.g. by a D2D controller such as the D2D controller 130 shown in FIG. 1. In some embodiments, different wireless communication systems or networks may not have the same reference frame number or associated reference time, in which case a roaming user equipment 305, 310 may need to re-synchronize with the reference frame number and reference time of the visited network and store the revised values in the memory elements 340, 345, 350, 355.

Some embodiments of the user equipment 305, 310 may use the reference frame number, which may be referred to as a D2D Reference Number (DFN), as the default frame counter to derive the transmission time of D2D physical channels, such as a primary D2D synchronization signal (PD2DSS) channel, a secondary D2D synchronization signal (SD2DSS) channel, or a scheduling assignment (SA) message channel. For example, the DFN may range from 0 to $DFN_{max}-1$, where the maximum value of the DFN is $DFN_{max}$. For PD2DSS/SD2DSS with a transmission period $P_{sync}$ and transmission offset $SyncC_{offset}$ at each subframe$_i$, the PDSDSS/SD2DSS may be transmitted when the following condition is met:

$$((10*DFN+subframe_i+Sync_{offset})\bmod(DFN_{max}*10))\bmod(P_{sync})=0$$

Similarly, for an SA message with a period $P_{SA}$ and a transmission offset $SA_{offset}$ at subframe$_j$, the SA message is transmitted when the following condition is met:

$$((10*DFN+subframe_j+SA_{offset})\mod(DFN_{max}*10))\mod(P_{SA})=0.$$

The default parameters used to derive the transmission times for the D2D physical channels may be configured or reconfigured while the user equipment 305, 310 are under coverage, e.g., in the network-assisted mode. Some embodiments may permanently update parameters such as the transmission period $P_{sync}$ or the transmission offset $SynC_{offset}$. For example, a D2D controller such as the D2D controller 130 shown in FIG. 1 may transmit the new parameters to permanently reconfigure the user equipment 305, 310. As used herein, the term "permanently" indicates that there is no time limit to the reconfigured parameters. However, the "permanently" reconfigured user equipment 305, 310 may be subsequently reconfigured by the D2D controller. Some embodiments may temporarily update parameters such as the period $P_{SA}$ and the transmission offset $SA_{offset}$. For example, the D2D controller may transmit the new parameters to reconfigure the user equipment 305, 310 for a predetermined time interval, after which the user equipment 305, 310 may return to its previous configuration.

The user equipment 305, 310 also include timing receivers 360, 365 that receive timing signals, e.g., a GPS reference timing signal or LTE network reference timing signal. The reference time may be an absolute time such as a reference time that is obtained directly from the timing receivers 360, 365. For example, the reference time may be a timing signal received from a GPS receiver, a network system timing reference such as an LTE system frame number (SFN), or timing derived from LTE system information such as an LTE system information block (SIB). Signals received by the timing receivers 360, 365 may be used to periodically tune or re-tune a local timing reference such as a local oscillator 370, 375 implemented in the user equipment 305, 310. Tuning the local oscillator 370, 375 may also be referred to as disciplining the local oscillator 370, 375. In some embodiments, either the timing signals received by the timing receivers 360, 365 or the timing reference provided by the local oscillator 370, 375 may be used as the reference time for D2D communication between user equipment 305, 310.

Each user equipment 305, 310 is identified by a permanent globally unique identifier 380, 385, which may be referred to as a proximity service identifier or a ProSe identifier. For example, the user equipment 305, 310 may be identified by permanent globally unique 128-bit identifiers 380, 385. The identifiers 380, 385 may be used to generate additional identifiers for D2D communication between the user equipment 305, 310. In some embodiments, identifiers for the physical link layer (layer 1 or L1) and the data link layer (layer 2 or L2) in the user equipment 305, 310 can be generated from the identifier 380, 385. For example, the L2 D2D identifiers can be derived from the identifiers 380, 385, stored in the corresponding user equipment 305, 310, and used to support one-to-one communication (unicast), one-to-many communication (groupcast), or one-to-all communication (broadcast). One or more L1 destination identifiers can also be derived from the identifiers 380, 385. The L1 destination identifiers may be mapped to corresponding L1 D2D identifiers for unicast, groupcast, or broadcast D2D communication. Each L1 D2D identifier is associated with one type of D2D communication and one D2D relationship. For example, the user equipment 305, 310 may include a first L1 D2D identifier for a unicast D2D relationship with another user equipment, a second L1 D2D identifier for a groupcast D2D relationship with a group of user equipment, and a third L1 D2D identifier for a D2D broadcast.

Security keys are associated with each L1 D2D identifier and may be used for encrypting or decrypting frames of the corresponding D2D communication. The security keys may be pre-provisioned. For example, a D2D controller such as the D2D controller 130 shown in FIG. 1 may provision the security keys to the user equipment 305, 310 during activation. Pre-provisioning the security keys allows the user equipment 305, 310 to perform secure D2D communications during either network-assisted or network-absent modes. Different security keys are used for each D2D relationship. For example, a first security key may be associated with the first L1 D2D identifier for secure unicast D2D communication with another user equipment that shares the first security key, a second security key may be associated with the second L1 D2D identifier to support secure groupcast D2D communication with a group of users that share the second security key, and a third security key may be associated with the third L1 D2D identifier to support secure D2D broadcast. The third security key may be a public key. Roaming user equipment 305, 310 may need to obtain new L2 D2D identifiers, L1 destination identifiers, L1 D2D identifiers, and the associated security keys from the visited network.

User equipment 305, 310 include data structures such as tables 390, 395 for storing security information associated with D2D communication. Some embodiments of the tables 390, 395 store an identifier such as an L1 identifier for each authorized D2D relationship, an indicator of the type of D2D relationship, and a security key associated with the D2D relationship. For example, the tables 390, 395 include an L1-ID1 to identify a unicast (UN) D2D relationship that is associated with the security key KEY 1, an L1-ID2 to identify a groupcast (GP) D2D relationship that is associated with the security key KEY 2, and an L1-ID3 to identify a broadcast (BD) D2D relationship that is associated with the security key KEY 3. The values of the keys (KEY 1, KEY 2, and KEY 3) are the same in both of the tables 390, 395 because the user equipment 305, 310 are authorized for unicast D2D communication with each other, are part of the same group for authorized groupcast D2D communication, and are authorized for the same broadcast D2D communication. However, the tables 390, 395 may not include all of the same information and may include other security keys and information identifying other authorized D2D relationships with other users, groups, or broadcasts.

The user equipment 305, 310 may use the security keys and other stored information to support secure D2D communication over the air interface 335. Some embodiments of the user equipment 305, 310 encrypt or decrypt frames of D2D communications using a pre-provisioned cryptographic function based on the security key and a crypto-sync value such as the current frame number for D2D communication. For example, an encrypted message (EM) may be generated from a plaintext message (PM) included in a frame of D2D communication using the cryptographic function (f), a security key (Key) and a crypto-sync value:

$$EM=f(PM, Key, cryptosync)$$

Numerous cryptographic functions such as secure hash algorithms are known in the art and in the interest of clarity are not discussed herein. The user equipment 305, 310 can determine the current frame number (and thus the crypto-sync value) based on the reference frame number stored in the memory elements 340, 345, the reference time stored in the memory elements 350, 355, and the current time, which may be provided by the timing receivers 360, 365 or the local oscillator 370, 375.

Figure 4:
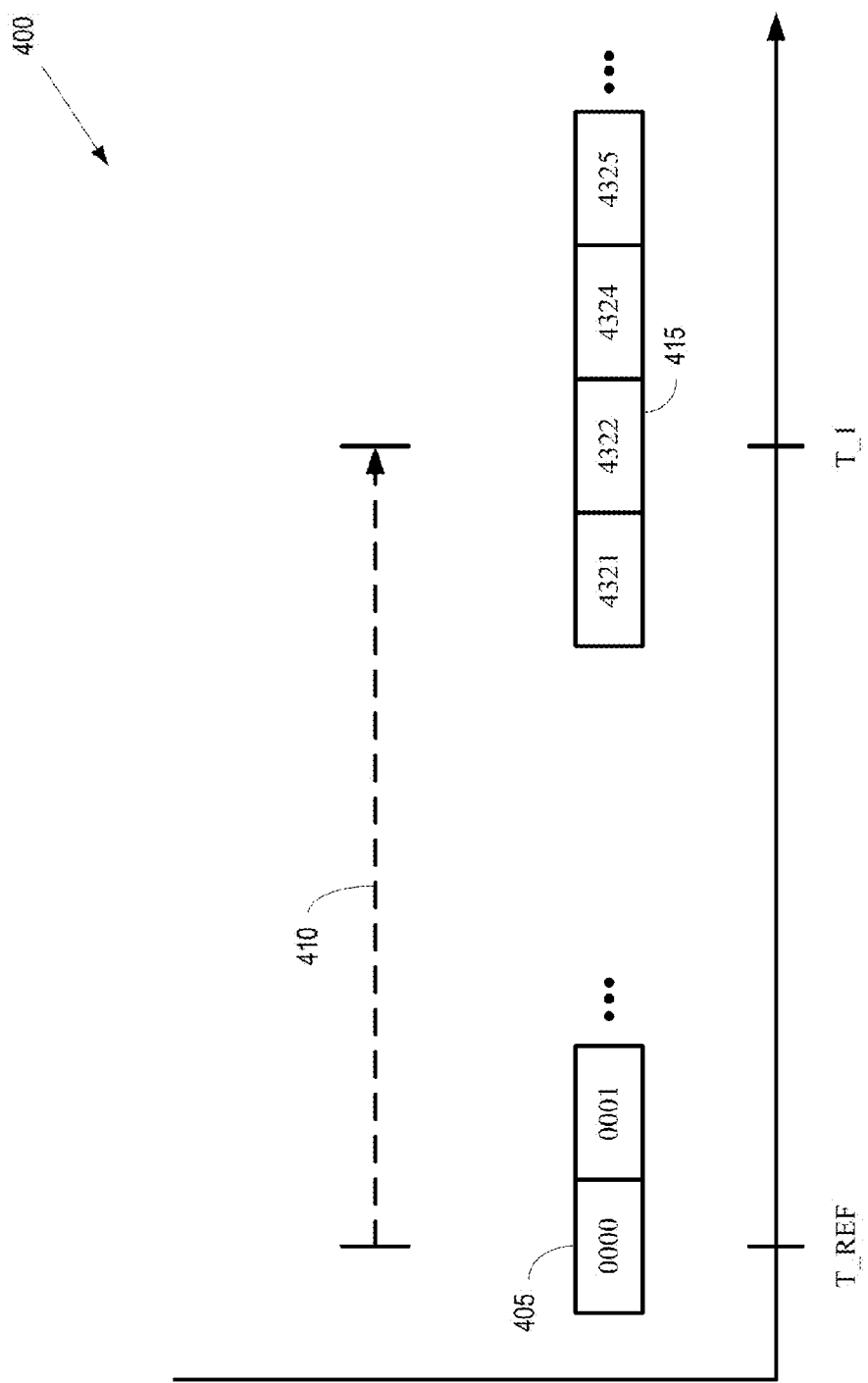
FIG. 4 is a diagram of a sequence of frames used for secure D2D communication according to some embodiments.

FIG. 4 is a diagram of a sequence 400 of frames used for secure D2D communication according to some embodiments. The horizontal axis indicates time increasing from left to right. User equipment that participate in D2D communication are synchronized to a global timing reference such as a GPS timing reference or an LTE network timing reference. A reference time (T_REF) corresponds to a reference frame 405 that has a reference frame number of 0000. However, the format, value, or range of the reference frame number are matters of design choice. Each frame occupies a predetermined time interval (such as 10 ms) and the frame number of each frame is incremented for each successive frame. User equipment may therefore determine the current frame number using the reference time, the reference frame number, and the current time. For example, user equipment may determine the current time (T_1) using a timing receiver such as the timing receivers 360, 365 shown in FIG. 3. The current time (T_1) can then be used to calculate an elapsed time 410 since the reference time (T_REF). The elapsed time 410 indicates the number of frames that have passed since the reference frame 405. Thus, the user equipment can determine the frame number of the current frame 415 by incrementing the frame number from the reference frame number based on the number of elapsed frames.

The frame number of the current frame 415 may therefore be used as a crypto sync value because it can be determined by any user equipment that have received the reference frame number and reference time from the wireless communication system. Furthermore, the frame number of the current frame 415 can be determined without network assistance because the information needed to determine the current frame 415 is pre-provisioned to the user equipment or can be determined by the user equipment without network assistance. User equipment may also determine the frame number of the current frame 415 at any time. For example, a user may determine the current frame number in response to powering up or in response to coming within range of another user equipment that is transmitting D2D communication.

Figure 5:
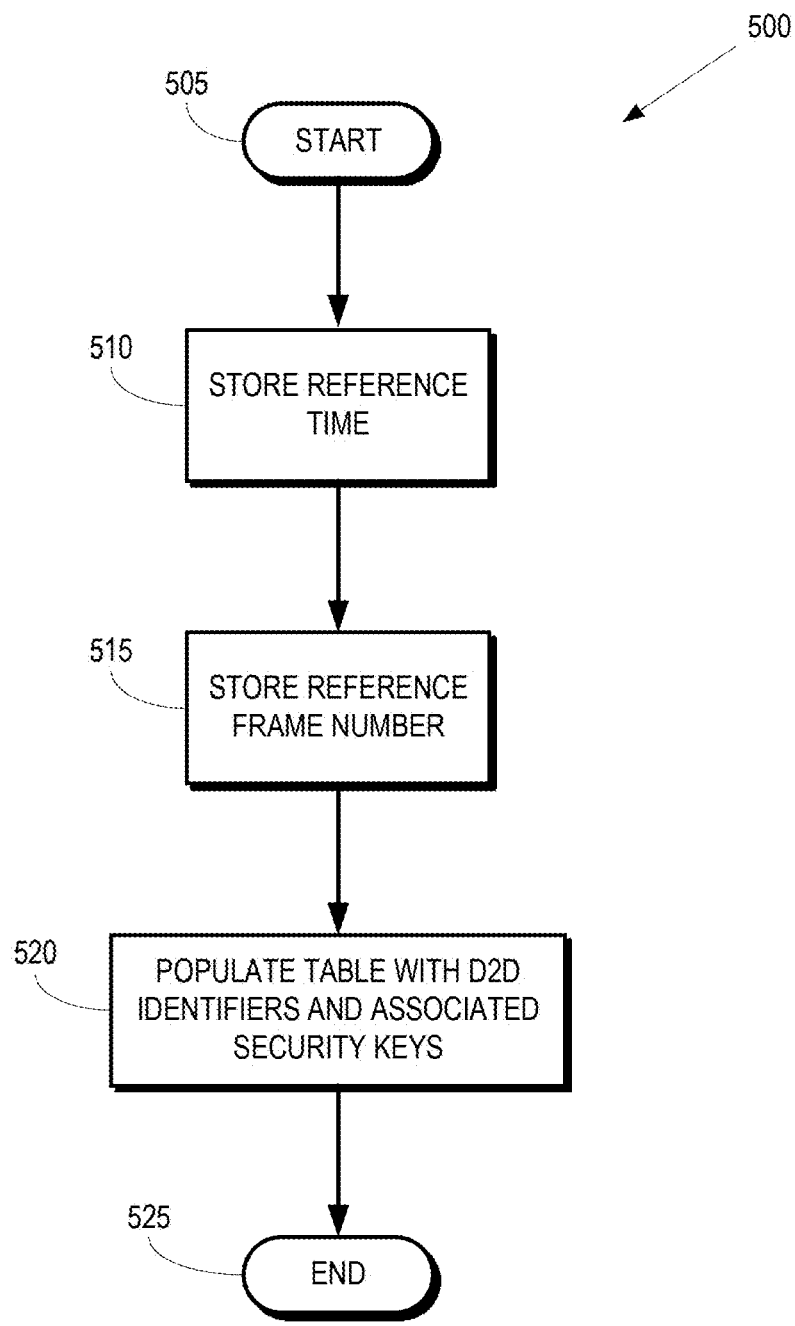
FIG. 5 is a flow diagram of a method for initializing user equipment for secure D2D communication according to some embodiments.

FIG. 5 is a flow diagram of a method 500 for initializing user equipment for secure D2D communication according to some embodiments. The method 500 may be implemented in embodiments of the D2D controller 130 and user equipment 110-112 shown FIG. 1 or embodiments of the user equipment 305, 310 shown in FIG. 4. The method 500 starts at block 505 in response to the user equipment being activated or authorized for D2D communication. At block 510, user equipment stores information indicating a reference time, which may be provided by the D2D controller during the activation process for D2D communication. At block 515, the user equipment stores information indicating the reference frame number that corresponds to the reference time. The reference frame number may be provided by the D2D controller during the activation process. The reference frame number and the reference time may be stored in memory elements such as the elements 340, 345, 350, 355 shown in FIG. 3. At block 520, a data structure such as a table in the user equipment (such as one of the tables 390, 395 shown in FIG. 3) is populated with D2D identifiers and the associated security keys for each authorized D2D relationship. For example, a D2D identifier and a corresponding security key may be provisioned to the user equipment for each authorized unicast D2D relationship, each authorized groupcast D2D relationship, and each authorized D2D broadcast. The method 500 ends at block 525.

Figure 6:
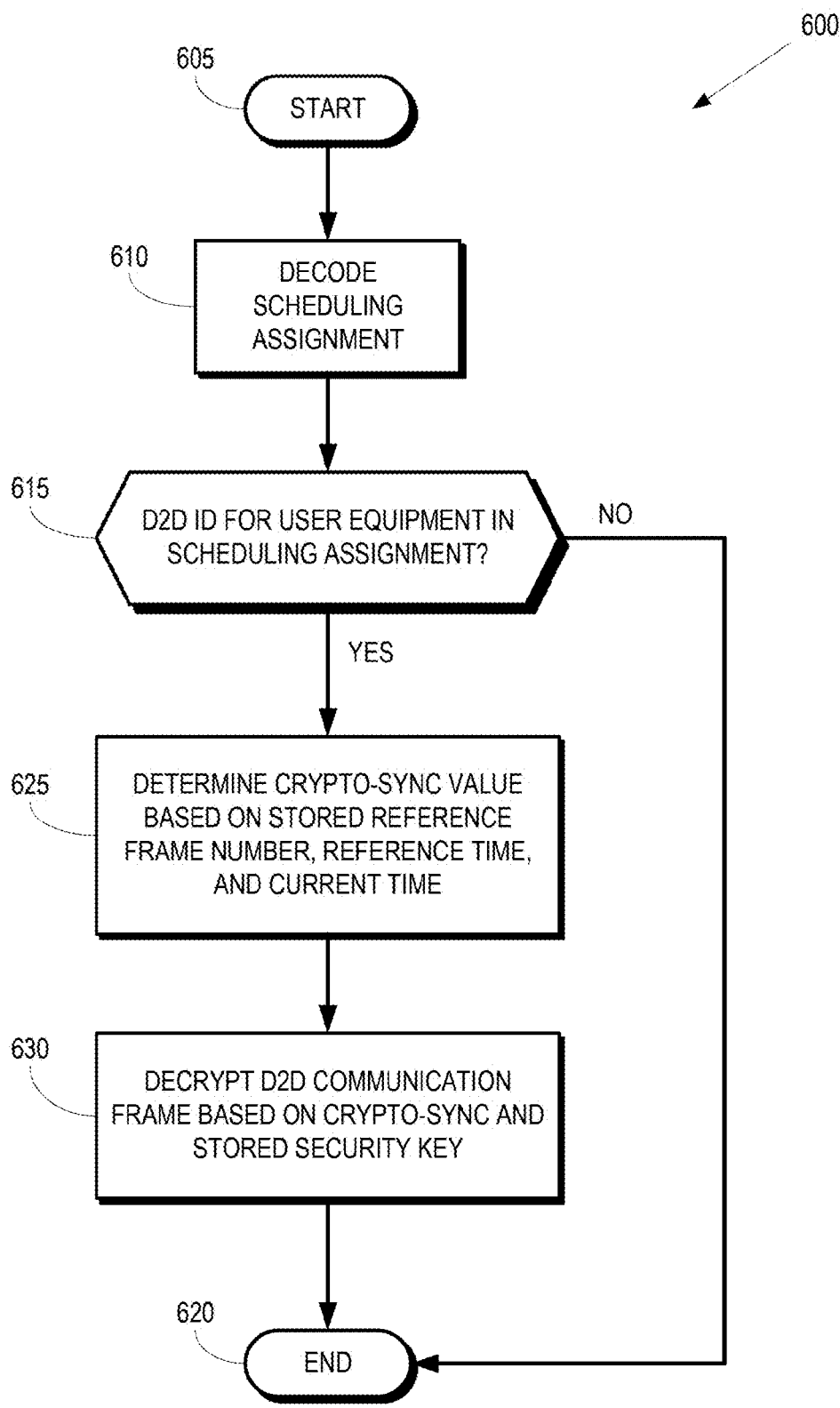
FIG. 6 is a flow diagram of a method for secure D2D communication according to some embodiments.

FIG. 6 is a flow diagram of a method 600 for secure D2D communication according to some embodiments. The method 600 may be implemented in embodiments of the user equipment 110-112 shown FIG. 1 or embodiments of the user equipment 305, 310 shown in FIG. 4. The method 600 starts at block 605 in response to the user equipment receiving a scheduling assignment message for D2D communication. Some embodiments of the scheduling assignment message include information indicating the resources that have been allocated for subsequent D2D communication over the air interface, as well as information identifying the user equipment that is to receive unicast D2D communication, groups of user equipment that are to receive groupcast D2D communication, or a broadcast D2D communication. The identifying information may include L1 D2D identifiers of user equipment, group identifiers, or broadcast identifiers. At block 610, the user equipment decodes the scheduling assignment message to access the information in the scheduling assignment message.

At decision block 615, the user equipment determines whether the identifying information in the decoded scheduling assignment message indicates that the user equipment is to receive the D2D communication. For example, the identifying information may indicate that the user equipment is the destination for unicast D2D communication, that the user equipment is a member of a group that is to receive groupcast D2D communication, or that the user equipment is to receive the broadcast D2D communication. If the user equipment is not intended to receive the D2D communication, the method 600 ends at block 620.

If the user equipment is intended to receive the D2D communication, the user equipment may determine a crypto-sync value for a current frame of the secure D2D communication (at block 625). Some embodiments of the user equipment may determine the crypto-sync value based on a stored reference frame number, a stored reference time, and a current time that may be indicated by an external timing reference (e.g., a GPS or LTE timing reference) or an internal timing reference such as a local oscillator. For example, the user equipment may set the value of the crypto-sync equal to the value of a current frame number that is calculated relative to the stored reference frame number based on the elapsed time between the stored reference time and the current time.

At block 630, the user equipment decrypts the current frame of the secure D2D communication based on the crypto-sync and a stored security key for the D2D relationship. The security key may be retrieved from a table such as the tables 390, 395 shown in FIG. 3. The value of the crypto-sync that was used to encrypt information in the current frame of the secure D2D communication is the same as the value of the crypto-sync computed by the user equipment because both the transmitting user equipment and the receiving user equipment use the same reference time and reference frame number to determine the current reference frame number. If more than one frame is transmitted as part of the secure D2D communication, the user equipment may continue to determine the crypto-sync value for each subsequent frame (at 625) and decrypt each subsequent frame (at 630) until the frames in the secure D2D communication have been decrypted. Once the secure D2D communication has been decrypted, the method 600 ends at block 620.

In some embodiments, certain aspects of the techniques or devices described in FIGS. 1-6 may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at a first user equipment, an encrypted message in a first frame over an air interface between the first user equipment and a second user equipment during device-to-device (D2D) communication with the second user equipment, wherein the encrypted message represents a plaintext message that is encrypted by applying a cryptographic function to the plaintext message, a security key, and a first frame number of the first frame; and
   decrypting, at the first user equipment, the encrypted message to recover the plaintext message using the cryptographic function, the security key, and the first frame number.

2. The method of claim 1, further comprising:
   accessing the security key from a data structure stored in the first user equipment based on a D2D identifier associated with the D2D communication, wherein the data structure is to store a plurality of security keys associated with a corresponding plurality of D2D identifiers.

3. The method of claim 2, wherein accessing the security key comprises accessing at least one of a unicast security key shared with the second user equipment, a groupcast security key shared with a group of user equipment comprising the first user equipment and the second user equipment, and a public key.

4. The method of claim 3, further comprising:
   decoding a scheduling assignment packet received by the first user equipment, wherein the scheduling assignment packet includes information indicating the D2D identifier associated with the D2D communication and resources allocated to subsequent data transmission comprising the first frame.

5. The method of claim 1, further comprising:
   encrypting information for transmission in a second frame over the air interface during D2D communication using the cryptographic function applied to the security key and a second frame number of the second frame.

6. A method comprising:
   determining, at a first user equipment, a first frame number of a first frame received over an air interface between the first user equipment and a second user equipment during device-to-device (D2D) communication with the second user equipment, wherein the first frame number is determined based on a reference frame number stored by the first user equipment, a corresponding reference time stored by the first user equipment, and a current time; and
   decrypting, at the first user equipment, information received in the first frame using a cryptographic function that is applied to a security key and a first frame number of the first frame.

7. The method of claim 6, further comprising:
   storing the reference frame number, the corresponding reference time, and the security key during activation of the first user equipment.

8. The method of claim 6, wherein determining the first frame number based on the current time comprises determining the first frame number based upon a current time indicated by at least one of a Global Positioning System (GPS) reference time, a Long Term Evolution (LTE) reference time, or a common reference time to discipline a local oscillator implemented in the first user equipment.

9. The method of claim 8, further comprising:
   determining at least one transmission time of at least one of a D2D synchronization signal or a scheduling assignment message based on the current time, the first frame number, and pre-configured values of at least one transmission period and at least one transmission offset that are stored in the first user equipment.

10. A first user equipment comprising:
a receiver to receive an encrypted message in a first frame over an air interface between the first user equipment and a second user equipment during device-to-device (D2D) communication with the second user equipment, wherein the encrypted message represents a plaintext message that is encrypted by applying a cryptographic function to the plaintext message, a security key, and a first frame number of the first frame; and
a processor to decrypt the encrypted message to recover the plaintext message using the cryptographic function, the security key, and the first frame number.

11. The first user equipment of claim 10, wherein the processor is to determine the first frame number based upon a current time indicated by at least one of a Global Positioning System (GPS) reference time, a Long Term Evolution (LTE) reference time, or a common reference time to discipline a local oscillator implemented in the first user equipment.

12. The first user equipment of claim 11, wherein the processor is to determine at least one transmission time of at least one of a D2D synchronization signal or a scheduling assignment message based on the current time, the first frame number, and pre-configured values of at least one transmission period and at least one transmission offset that are stored in the first user equipment.

13. The first user equipment of claim 10, further comprising:
at least one data structure to store a plurality of security keys associated with a corresponding plurality of D2D identifiers, wherein the processor is to access the security key from the data structure based on a D2D identifier associated with the D2D communication.

14. The first user equipment of claim 13, wherein the security key comprises at least one of a unicast security key shared with the second user equipment, a groupcast security key shared with a group of user equipment comprising the first user equipment and the second user equipment, and a public key.

15. The first user equipment of claim 13, wherein the processor is to decode a scheduling assignment packet received by the first user equipment, wherein the scheduling assignment packet includes information indicating the D2D identifier associated with the D2D communication and resources allocated to subsequent data transmission comprising the first frame.

16. The first user equipment of claim 10, wherein the processor is to encrypt information for transmission in a second frame over the air interface during D2D communication using the cryptographic function applied to the security key and a second frame number of the second frame.

17. An apparatus comprising:
a processor to determine a first frame number of a first frame received over an air interface between the first user equipment and a second user equipment during device-to-device (D2D) communication with the second user equipment, wherein the processor determines the first frame number based on a reference frame number stored by the first user equipment, a corresponding reference time stored by the first user equipment, and a current time, and
wherein the processor is to decrypt information received by the first user equipment in the first frame using a cryptographic function that is applied to a security key and a first frame number of the first frame.

18. The apparatus of claim 17, further comprising:
at least one memory element to store the reference frame number, the corresponding reference time, and the security key during activation of the first user equipment.

19. A non-transitory computer readable storage medium embodying a set of executable instructions, the set of executable instructions to manipulate at least one processor to:
receive an encrypted message at a first user equipment in a first frame over an air interface between the first user equipment and a second user equipment during device-to-device (D2D) communication with the second user equipment, wherein the encrypted message represents a plaintext message that is encrypted by applying a cryptographic function to the plaintext message, a security key, and a first frame number of the first frame.

20. The non-transitory computer readable storage medium of claim 19, wherein the set of executable instructions is to manipulate the at least one processor to store a plurality of security keys associated with a corresponding plurality of D2D identifiers in a data structure in the first user equipment and access the security key from the data structure based on a D2D identifier associated with the D2D communication.

21. The non-transitory computer readable storage medium of claim 19, wherein the set of executable instructions is to manipulate the at least one processor to encrypt information for transmission in a second frame over the air interface during D2D communication using the cryptographic function applied to the security key and a second frame number of the second frame.

22. A non-transitory computer readable store medium embodying a set of executable instructions, the set of executable instructions to manipulate at least one processor to:
determine a first frame number of a first frame received over an air interface between the first user equipment and a second user equipment during device-to-device (D2D) communication with the second user equipment, wherein the first frame number is determined based on a reference frame number stored by the first user equipment, a corresponding reference time stored by the first user equipment, and a current time; and
wherein the set of executable instructions is to manipulate the at least one processor to decrypt information received at the first user equipment in the first frame using a cryptographic function that is applied to a security key and a first frame number of the first frame.

* * * * *